United States Patent
Endo et al.

(10) Patent No.: US 7,171,465 B1
(45) Date of Patent: Jan. 30, 2007

(54) METHOD FOR DETERMINING A SERVER COMPUTER WHICH CARRIED OUT A PROCESS MOST RECENTLY, AND HIGH AVAILABILITY COMPUTER SYSTEM

(75) Inventors: Kotaro Endo, Fuchu (JP); Koji Yamamoto, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 1195 days.

(21) Appl. No.: 09/667,769

(22) Filed: Sep. 22, 2000

(30) Foreign Application Priority Data

Dec. 22, 1999 (JP) ............................ 11-364571

(51) Int. Cl.
*G06F 15/173* (2006.01)
*G06F 15/177* (2006.01)

(52) U.S. Cl. ................. 709/224; 709/223; 709/220
(58) Field of Classification Search ............ 709/203, 709/205, 208, 209, 214, 215, 228, 240
See application file for complete search history.

(56) References Cited

U.S. PATENT DOCUMENTS 5,757,642 A * 5/1998 Jones ........................... 700/5
5,781,910 A * 7/1998 Gostanian et al. ......... 707/201
6,014,686 A * 1/2000 Elnozahy et al. .......... 709/202
6,553,401 B1 * 4/2003 Carter et al. ............... 709/200

* cited by examiner

*Primary Examiner*—Ario Etienne
*Assistant Examiner*—Hussein El-chanti
(74) *Attorney, Agent, or Firm*—Finnegan, Henderson, Farabow, Garrett & Dunner, L.L.P.

(57) ABSTRACT

A cluster management unit provided in each of two servers carries out a state-transition in accordance with a state transition diagram both in cases where a fault occurs in at least one of the two servers and where the server is restored from the fault. A state writing processor provided in a server priority process unit of the each server stores, into a disk drive, a server priority determined based on a server state indicated by state change information. When faults occur in the two servers and at least one of the two servers is thereafter restored from the fault, a comparing processor in the server priority process unit of the one server determines whether or not the priority of the one server is higher than the priority of the other server, based on at least the priority of the one server. The cluster management unit of the one server carries out a corresponding state-transition based on this determination result and state transition diagram.

12 Claims, 5 Drawing Sheets

METHOD FOR DETERMINING A SERVER COMPUTER WHICH CARRIED OUT A PROCESS MOST RECENTLY, AND HIGH AVAILABILITY COMPUTER SYSTEM

CROSS-REFERENCE TO RELATED APPLICATIONS

This application is based upon and claims the benefit of priority from the prior Japanese Patent Application No. 11-364571, filed Dec. 22, 1999, the entire contents of which are incorporated herein by reference.

BACKGROUND OF THE INVENTION

The present invention relates to a high availability (HA) computer system, in which one of two server computers carries out a process as a master server computer and the other server computer takes over the process when a fault occurs in the master server computer. Preferably, the present invention relates to a method to determine a server computer which executed the process most recently, when a server computer is restored from a fault.

Various kinds of cluster type fault tolerant computer systems have been developed since before. Generally, this cluster type fault tolerant computer system is constructed by connecting a plurality of server computers (hereinafter referred to as server), for example, two servers through a network or the like. A feature of this type computer system is that even if a fault occurs in a server, the other server takes over a process (service) halted due to the fault in order to maintain availability of the entire system. Thus, this type computer system is called HA (high availability) computer system.

Some kind of the HA system includes a shared storage unit such as a shared disk drive. In this computer system, generally, the shared storage unit contains information necessary for taking over a process from a given server to the other server when one server is carrying out the process. In such a computer system, when faults occur in both two servers and then the both servers are restored from the faults or any one server is restored from the fault, any server restored from the fault is capable of taking over the process easily by using the aforementioned information stored in the shared storage unit.

However, some HA computer system does not have the shared storage unit. In this computer system, generally when one server is carrying out the process, that server sends information necessary for taking over the process from that given server to the other server in order to enable taking over of the process between the servers. Consequently, if a fault occurs in a server which is carrying out a process so that it becomes incapable of continuing the process, the other server is capable of taking over that process by using the information received from the one server up to then, that is, the process can be handed over from the one server to the other one.

However, it is not easy to hand over the process from one to the other when faults occur in both of the servers at the same time. The reason is that, for example, when both of the servers are restored from the fault, which server should continue that process must be determined. Further, when any one of them is restored from the fault, whether or not the restored server should take over the process is determined. This kind of the conventional technology will be described below.

When faults occur in two servers and after that, both of the servers are restored from the fault, for a server (share server) which is off the process to then to take over the process, the slave server needs to be given information for taking over the process from a server (master server) which carried out the process to then. However, if the slave server is already in fault before a fault occurs in the master server which carried out process most recently, the master server does not send information for handing over the process to the slave server. In this case, the slave server cannot taking over the process. Thus, when the both servers are restored from the fault, it is necessary to determine (select) a server which carried out the process most recently as a server which should take over the process.

On the contrary, if information for taking over the process is sent from the master server to the slave server before a fault occurs in the master server which carried out the process most recently, it looks as if any server is capable of continuing the process when both of the servers are restored from the fault. However, if the process which the master server carried out just before a fault occurs is a process for sending information necessary for taking over the process to the slave server, there is a possibility that the fault may have occurred before sending of that information is completed. Considering such a possibility, it is necessary to select the server which carried out the process most recently in this case also. Further, if any one of the two servers is restored from the fault, generally, a condition which allows that server to take over the process is that the server executed the process most recently. The reason why this condition is employed is the same as when both of the servers are restored from the fault.

For the reason described above, conventionally, any one of the following two methods have been employed in order to determine a server which carried out the process most recently.

(1) Method in which taking-over of the process is limited to once

Preliminarily, one of the two servers is set up to primary server while the other one is set to secondary server. Then, first, the operation is started with the primary server as a master and the secondary server as a slave. Here, the master carries out a process requested by a client (client computer) and sends information necessary for the taking-over to the slave. The slave receives the information for the taking-over sent from the master and stores it in its local external storage unit such as a disk drive unit. In this case, if the secondary server accepts taking over of the process because a fault occurs in the primary server, even if the primary server is restored from the fault, the primary server is not used as a slave. That is, the taking-over of the process is limited to once. In this case, if the secondary server is made to store whether or not it carried out the process in its own external storage unit, it is possible to determine which server carried out the process most recently. However, according to this conventional method, the taking-over of the process is limited to once. Thus, this method is not capable of achieving automatic operation in which the process is continued as long as possible even if a fault occurs in one or both of the servers or one or both of the servers are restored from the fault at any time.

(2) Method which uses time information

In this method, clocks (time) of two servers are set up preliminarily. When the server starts a process, a current time is stored in the external storage units which they provide. Consequently, by sending and receiving time information stored in the external storage units when both of the servers are restored from the fault, through a network, it is possible to determine a server which has newer time information to be a server which carried out the process most recently. This method using time information is on an assumption on time which has a global meaning or that the clocks of the respective servers are always synchronous with each other. However, the actual clocks are not always synchronous and therefore, this method has a problem in its determination accuracy. Further, if only one server is restored from a fault, the server is not capable of determining whether it carried out the process most recently, because it is not capable of sending or receiving time information to/from the other server.

In the above described conventional HA computer system in which one of two servers carries out a process and if a fault occurs in the one server, the other server is capable of taking over the process, because no shared storage unit is provided, "a method in which the taking over of the process is limited to once" or "a method using time information" is employed as a method for determining a server which carried out the process most recently. However, the method in which the taking over of the process is limited to once has such a problem that the automatic operation is disabled because the taking over of the process can be conducted only once. On the other hand, the "method using time information" has such a problem in the determination accuracy for time. Further, there is also a problem that if only one server is restored from a fault, that server is not capable of determining whether or not it is a server which carried out the process most recently.

BRIEF SUMMARY OF THE INVENTION

The present invention has been made in considerations of the above problems and an object of the invention is to provide a HA (high availability) computer system in which a limitation on the frequency of taking-over of a process is eliminated so as to realize automatic operation by determining a server which carried out the process most recently using only local information without using such global information such as time information, thereby a determination accuracy being improved.

To achieve the above object, according to the present invention, there is provided a method for determining a server which carried out a process most recently, applicable to a HA computer system comprising a master server and a slave server each having a storage unit, the method comprising the steps of: executing state-transition of the servers when a fault occurs in the server or the server is restored from the fault; storing a priority determined by the state-transition into the storage unit; determining, when the server is restored from the fault, whether or not the priority of the server restored from the fault is higher; and determining that the server restored from the fault becomes a server to take over a process, when the priority of the server is higher.

According to such a method, a state variable which is a server priority determined by a transition of the server state based on a predetermined state transition diagram is stored in a storage unit and then, a server which carried out the process to most recently is determined using the state-transition and the local state variable. Thus, automatic operation is achieved by eliminating the limitation on the frequency of taking-over of the process.

For a process of each server after faults occur in the servers and then, the servers are restored from the faults, the step for determining the priority may include the step of comparing the priorities of the servers when they are restored from the faults so as to determine which priority is higher.

Further, the step for determining the priority may include the steps of: when faults occur in the servers and after that, one thereof is restored from the fault, determining whether or not the priority of the each server is the highest priority; and only when the priority is determined to be the highest priority, determining that the priority of the each server is higher.

Further, each server may be constructed to assume four states. The first state is master state in which the server carriers out the process and has a mate which takes over the process. The second state is single master state in which the server carries out the process and has no mate which takes over the process. The third state is slave state in which the server does not carry out the process but has information necessary for taking over of the process. The fourth state is halt state in which the server does not carry out the process and holds no further information necessary for taking over of the process.

By classifying the state of the server carrying out a process into the master state in which the server has a mate which takes over the process and the single master state in which the server does not have a mate which takes over the process, the local state variables (server priority) of both of the servers are inhibited from being of the same value, so that the determination accuracy for a server which carried out the process most recently can be improved by using such local state variables.

This effect becomes more remarkable if the step of storing the priority includes the steps of: changing the priority of the each server so as to indicate the highest priority, when the state of the each server is changed to the single master state; changing the priority of the each server so as to indicate the second highest priority, when the state of the each server is changed to the master state; changing the priority of the each server so as to indicate the lowest priority, when the state of the each server is changed to the slave state; and prohibiting the priority of the each server from changing, when the state of the each server is changed to the halt state.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
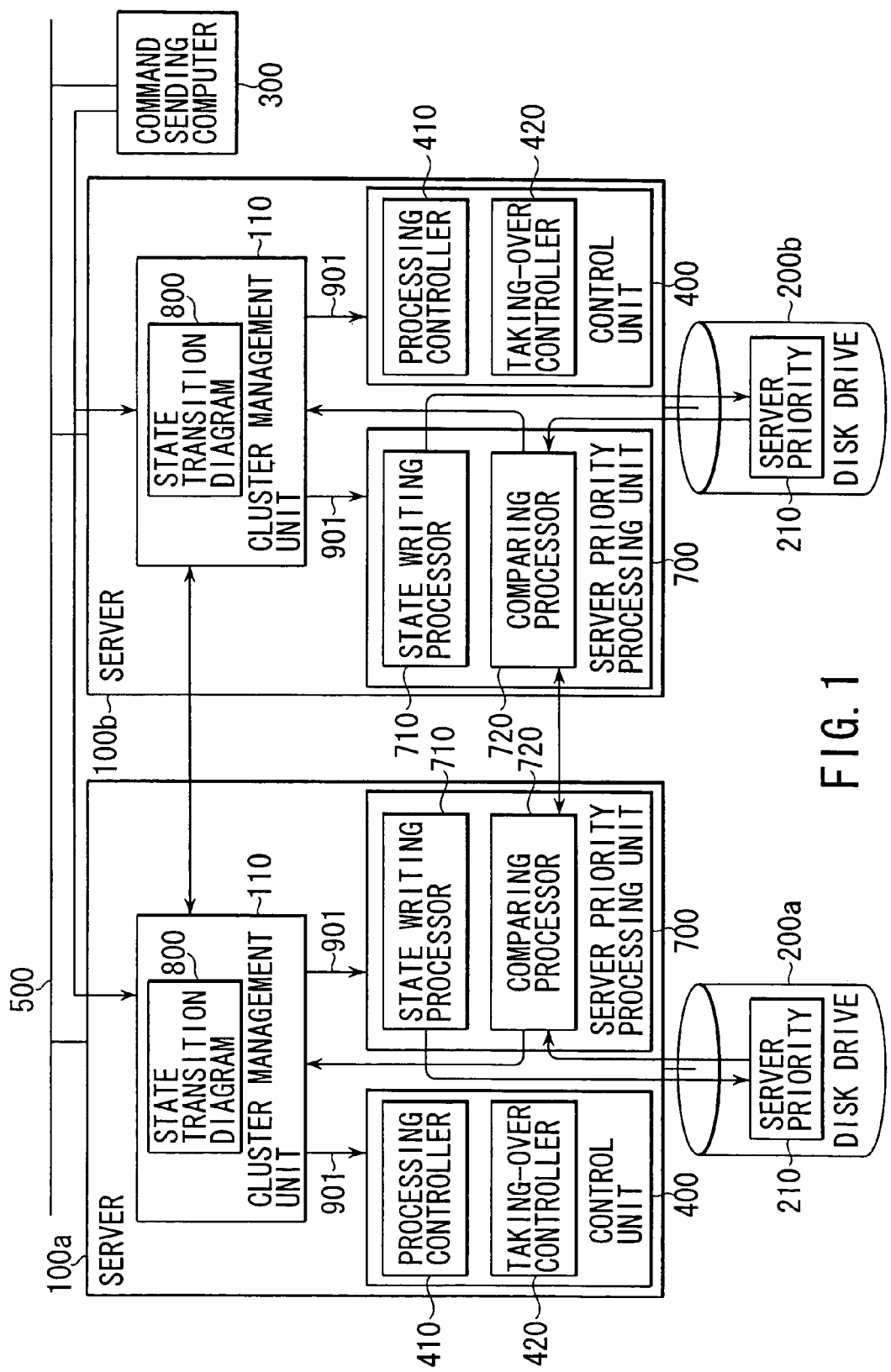
FIG. 1 is a block diagram showing a structure of a HA computer system according to an embodiment of the present invention.

Hereinafter, the embodiments of the present invention will be described with reference to the accompanying drawings. FIG. 1 is a block diagram showing a structure of a HA computer system according to an embodiment of the present invention. In the system shown in FIG. 1, two servers (server computers) 100a and 100b and a command sending computer 300 are connected to a network 500. Additionally, a client (client computer) (not shown) which receives service from the server 100a or 100b is also connected to the network 500. Pay attention to that this computer system has no shared storage unit.

The computer system shown in FIG. 1 has a structure that either the servers 100a or 100b carries out a process and even if a fault occurs in one server which is currently executing the process, the other server is capable of taking over the process. Particularly, a feature of this computer system is that if faults occur in both of the servers 100a and 100b and, at least one of them is thereafter restored from the fault, this computer system is capable of determining accurately a server which should take over the process, that is, a server which carried out the process most recently. Such a determining system will be described later.

The "fault" means not only hardware fault and software fault, but also the state in which the process in the server cannot be continued because, for example, the power supply to the server is stopped. The "restoration from fault" means not only restoration from hardware fault and restoration from software fault, but also restoration into a state capable of carrying out the process in the server, including the re-start of the power supply.

To enable to take over the process between two servers, a server intended to take over the process must receive information necessary for continuing the process from a server which carries out the process to then. However, a system not having the shared storage unit, like this embodiment, is not capable of transferring information between servers through the shared storage unit. Thus, the server which is carrying out the process must send the information necessary for the taking over to the other server. However, this method is sometimes incapable of judging a server which carried out the process most recently as described in Description of the Related Art for the reason of a relation between fault occurrence time and transmission period for the information necessary for the taking-over. Thus, as a method for determining easily a server which carried out the process most recently, the "method in which the taking-over of the process is limited to once" and "method using time information" described in Description of the Related Art have been well known. However, the former method has a problem that it is not capable of automatic operation and the latter method has a problem that the judging accuracy is insufficient.

Here, the automatic operation will be described. The automatic operation means, as described in Description of the Related Art, an operation method for continuing the process as far as possible even if one or both of the two servers get into fault at any time or one or both thereof are restored from the fault at any time. To achieve the automatic operation, at least, the following actions (1) to (4) must be carried out.

(1) When two servers get into fault and after that, the two servers are restored from the fault, whether or not the process can be carried out by any one of the two servers is determined. If possible, a server which should carry out the process is determined so as to start the process on that server. The other server gets into a state which allows taking over of the process. The state which allows taking over of the process means sending information necessary for taking over the process from a server which is now carrying out the process to the other server so that even if a fault occurs in the server now carrying out the process, the other server is capable of taking over the process from that server.

(2) When a fault occurs in two servers and after that, one server is restored from the fault, whether or not the process can be executed on that restored server is determined. If possible, the process is started in that server.

(3) If a server is carrying out the process and the other one is in fault, when the server in fault is restored from that fault, that server is capable of taking over the process.

(4) If a server is carrying out the process and the other one is in a state capable of taking over the process, if a fault occurs in the server carrying out the process, the other one takes over the process.

In addition to these actions (1) to (4), the following condition must be always considered.

(5) The server may get into fault at any timing.

Figure 2:
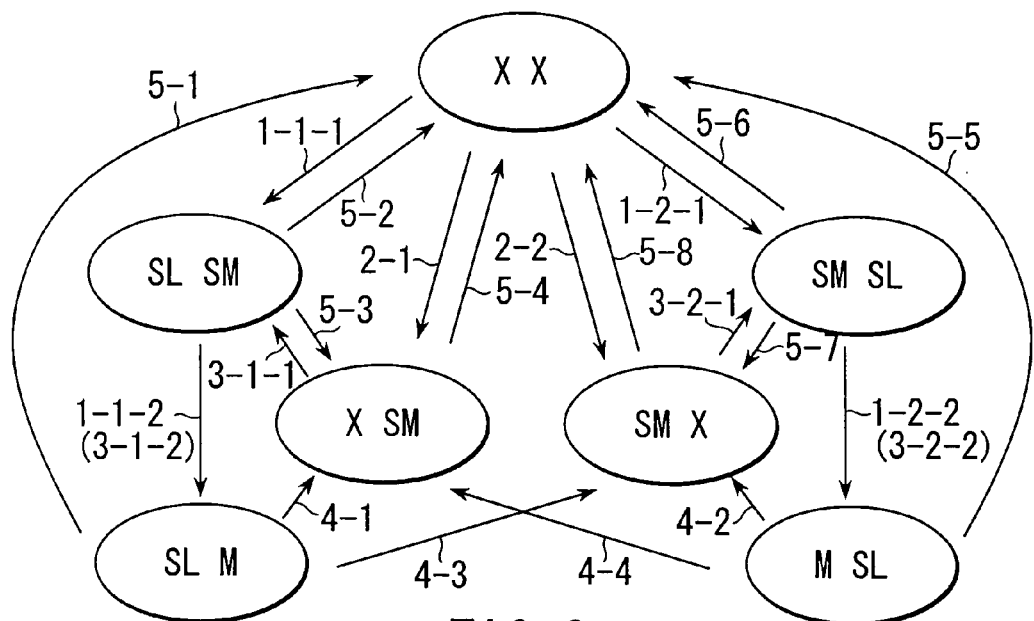
FIG. 2 is a diagram for explaining state transition diagram 800 employed in the same embodiment.

According to this embodiment, the state transition diagram 800 shown in FIG. 2 is prepared on the servers 100a and 100b based on the above described (1) to (5). Here, the server state is classified to four states, namely, master M, single master SM, slave SL and halt X. That is, according to this embodiment, the conventional master M is classified to two states, master M and single master SM, so that the single master SM is added to the three states including master M, slave SL and halt X.

The server state is classified as follows based on whether or not that server is carrying out the process.

State of server carrying out the process: two states including mater M and single master SM State of server not carrying out the process: two states including slave SL and halt X Further, the states of the server "carrying out the process" and "not carrying out the process" are classified as follows.

State of server carrying out the process:

server for which a mate for taking over a currently executed process exists: master M server for which a mate for taking over a currently executed process does not exist: single master SM State of server not carrying out the process:

server having information necessary for taking over the process: slave SL server not having information necessary for taking over the process: halt X Because when a fault occurs in a server, that server does not carry out the process and the process cannot be handed over as evident, the state of that given server becomes halt X.

In the state transition diagram 800 shown in FIG. 2, assuming the state of a server (for example, server 100*a*) is A and the state of the other server (for example, 100*b*) is B, the state of the system is represented with (A B). (A B) and (B A) indicate different states. Here, respective states to be applied in the state transition diagram 800 of FIG. 2 will be described. First, (X, X) indicates a state in which both of the servers are halted. More specifically, any one of them does not carry out the process and the process cannot be taken over. (SM SL) and (SL SM) indicate that one server is SM (single master) state while the other server is in SL (slave) state. More specifically, these indicates a state in which information for taking over the process is sent from a server in the SM state to a server in the SL state in order to secure a system state which enables taking over of the process. In this state, although the process is being carried out by one server, the other server is not capable of taking over the process.

(SL M) and (M SL) indicate that one server is in M (master) state while the other server is in SL (slave) state. More specifically, the process is being carried out by one server and the other server is currently capable of taking over that process. (X SM) and (SM X) indicate that one server is in SM (single master) state while the other server is in X (halt) state. More specifically, although one server is carrying out the process, information necessary for taking over the process cannot be sent from that server to the other server. That is, the taking over of the process is impossible.

Next, the aforementioned actions (1) to (4) and the state (5) will be described with reference to the state transition diagram 800 of FIG. 2. Meanwhile, in a following description, the state (5) will be stated as action (5) for convenience.

Action (1):

A state in which two servers are in fault at the same time and halted is indicated by (X X). When both of the servers are restored from the fault, as shown in FIG. 2, the state-transition, from 1-1-1 to 1-1-2, is carried out or the state-transition, from 1-2-1 to 1-2-2, is carried out. If both of the servers are restored from the fault, one of the servers starts the process. To secure a system condition which enables the taking over of the process, information necessary for the taking over is transmitted from the server carrying out the process to the other server (the state-transition 1-1-1 or 1-2-1). This is (SL SM) or (SM SL) state. If the system condition enabling the taking over of the process is secured after that, one server is kept in the slave state while the other server is changed from single master to master, that is, the state is changed to (SL M) or (M SL) state (the state-transition 1-1-2 or 1-2-2). Even with this condition, the information necessary for taking over of the process is sent from the master to the slave.

Action (2):

If both of the servers are in fault (halted) (X X) and then one of them is restored from the fault, the state-transition (2-1) or (2-2) is carried out. This is the state-transition for making the restored server into a state capable of carrying out the process (single master state), so that the state is changed to (X SM) or (SM X).

Action (3):

The state in which one server is carrying out the process while the other one is in fault (halted) is indicated by (X SM) or (SM X). If the halted server is restored from the fault with the state of (X SM) or (SM X), the state-transition, from 3-1-1 to 3-1-2 or from 3-2-1 to 3-2-2, is carried out. If the halted server is restored from the fault with the state of (X SM) or (SM X), one server is kept in the single master state while the other one is changed from the halted state to slave state (the state-transition 3-1-1 or 3-2-1). In this state, information necessary for taking over of the process is transmitted from a server currently carrying out the process (single master) to the other server (slave). This is (SL SM) or (SM SL) state. After that, if taking over of the process is made possible, one server is kept in the slave state while the other one is changed from single master state to master state, or (SL M) or (M SL) state (the state-transition 3-1-2 or 3-2-2) like in Action (1). This is state-transition for establishing the master and slave states with a server carrying out the process up to then as master and a restored server as a slave.

Action (4):

The system condition which enables taking over of the process is a state in which two servers are in (SL M) or (M SL) state. If a fault occurs in a server in the slave state under this system condition, the system condition is changed to (x SM) or (SM X) state (a state-transition 4-1 or 4-2). In this state-transition, the process is continued by the same server and taking over of the process is not carried out. On the contrary, if a fault occurs in a server in master state, the (SL M) or (M SL) state is changed to (SM X) or (X SM) state (a state-transition 4-3 or 4-4). This is a state-transition for a server kept in the slave state up to then to take over the process.

Action (5):

If a fault occurs in a server, the server is always halted (state X). This is a state-transition, i.e., any one of the transitions 5-1 to 5-8. Respective actions will be described below. If fault occurs in both of the servers with one in the master state and the other one in the slave state, namely (SL M) or (M SL), state-transitions of 5-1 to 5-5 are carried out so that the (X X) state is achieved. A fault may occur in one of the servers in the single master state, with information for taking over of the process being transmitted from the single master server to a server set in the slave state, in (SL SM) or (SM SL) state. In this case the process is impossible. Thus, both of the servers are halted that is, become in the (X X) state. This is state-transition of 5-2 or 5-6. If fault occurs in both of the servers with (SL SM) or (SM SL) state, the state-transition of 5-2 or 5-6 is carried out so that both of the servers are halted. If a fault occurs in a server in the slave state with (SL SM) or (SM SL) state, state-transition of 5-3 or 5-7 is carried out, so that the state of (X SM) or (SM X) is achieved. Under this state, the process is continued by a remaining server (server in single master state). Next, if with one server in single master and the other one halted, that is, with (X SM) or (SM X) state, a fault occurs in the server in single master state, both of the servers are halted, that is, (X X) is attained. This is state-transition of 5-4 or 5-8.

As described above, the state transition diagram 800 shown in FIG. 2 includes the actions (1) to (5) for automatic operation. Because for the actions (3) to (5) of the actions (1) to (5), which server state should be changed is already determined, control is easy. However, for the action (1), it is necessary to determine whether or not a server which should take over the process is itself. Further, for the action (2) also, it is necessary to determine whether or not the restored server from the fault may take over the process as it is. The feature of this embodiment is that the method for determining the server which should take over the process in the actions (1) and (2) has been devised using the aforementioned server classification. A detail of this determining method will be described later. Here, a case where a server which carried out the process most recently becomes a server for taking over the process will be described.

First, in the action (1), the condition for a server to take over process is a server which carried out the process most recently of two servers. The reason for that will be described below. According to this embodiment, for a server which is off the process up to then, it must be given information for the taking over from a server which carried out the process. If the information necessary for taking over of the process is not sent to the other server just before a fault occurs in a server which carried out the process most recently, the process cannot be continued by the other server. Therefore, the server which carried out the process most recently needs to be a server for taking over the process. Next, if before a fault occurs in the server which carried out the process most recently, the information for taking over of the process is transmitted from that server to the other server, it looks that any server is capable of continuing the process. However, if a process which the server which carried out the process most recently executes just before the fault occurs is a process for sending the information necessary for taking over of the process to the other server, there is a possibility that the fault occurred before the sending of that information is completed. Thus, in this case also, the server which carried out the process most recently needs to be a server which should take over the process. For the reason described above, in the action (1), the server which carried out the process most recently must take over the process. Next, for the action (2), the condition for a server restored from the fault to carry out the process is that the restored server is a server which carried out the process most recently for the same reason as for the action (1).

Meanwhile as a method for determining whether or not it is a server which carried out the process most recently, "method using time information" as mentioned in Description of the Related Art has been well known. This "method using time information" is on an assumption of global factor, time or an assumption that clocks of respective servers are always synchronous with each other. However, because actual clocks are not always synchronous, the "method using time information" has a problem in accuracy of time determination.

Therefore, this embodiment employs a method of determining a server which carried out the process most recently, by only using the local information the server has. However, the local information has such a problem. The local information cannot be changed from other server if a server having that information is halted. Thus, there is a possibility that informations had by respective servers are inconsistent. About this problem, an example in which a server carrying out the process has information that it is carrying out the process will be described. In this example, the server carrying out the process has local information saying "it is carrying out the process itself". After that, if a fault occurs in this server and the other server takes over the process, that other server comes to have the local information of "it is carrying out the process". At this time, the information of "it is carrying out the process" had by the troubled server cannot be rewritten. Further, assume that with this condition, the other server also gets into fault and after that, both of the servers are restored from each fault. At this time, it comes that both of the servers have the local information of "it is carrying out the process itself". Therefore, only if a server carrying out the process has the local information of "it is carrying out the process", which server carried out the process most recently cannot be determined.

Then, according to this embodiment, respective server conditions which can be classified to four types including single master are controlled based on the state transition diagram 800 shown in FIG. 2. By each server's having state variable called server priority order which can be changed to three conditions as the local information, this problem is solved.

Then, referring to FIG. 1 again, the servers 100a and 100b have the same structure. That is, the servers 100a and 100b are each provided with cluster management unit 110, control unit 400 and server priority process unit 700. These units 110, 400 and 700 are functional means which are achieved when each of the servers 100a and 100b reads and executes a predetermined software program. Here, software (cluster software) for achieving the cluster management unit 110, software (process software) for achieving the control unit 400 and software (server priority control software) for achieving the server priority process unit 700 are stored in the same storage medium, for example, CD-ROM when they are provided. Then, those softwares are installed in each of the disk drives 200a and 200b provided in the servers 100a and 100b, respectively. Meanwhile, the softwares may be installed in the disk drives 200a and 200b preliminarily or may be stored in respective separate storage mediums. Further, they may be down loaded through a network 500.

The cluster management unit 110 of the server 100i (i is a or b) has a function for carrying out state-transition control based on the state transition diagram 800 shown in FIG. 2. That is, the cluster management unit 110 of the server 100i carries out the state-transition control on the servers 100i and 100j based on a predetermined state transition diagram 800 by communicating with the cluster management unit 110 operated on the other server 100j (j is a or b while i≠j) through the network 500. Further, the cluster management unit 110 of the server 100i sends state change information 901 indicating an update state-transition to the control unit 400 and the server priority process unit 700 in order to achieve state-transition.

The cluster management unit 110 of the server 100i, when both of the server 100i and 100j are halted and then the server 100i operated thereby is restored from fault, sends the state change information 901 indicating that the server 100i is restored from the fault to the server priority process unit 700 of the server 100i. Further, the cluster management unit 110 of the server 100i detects an occurrence of fault in the server 100j and restoration of the server 100j from the fault so as to achieve state-transition by communication with the cluster management unit 110 of the server 100j. When the server 100i is restored from the fault, the cluster management unit 110 of the server 100i investigates whether or not the server 100j is also restored from the fault after a predetermined time interval elapses by communication with the server 100j and after that, sends state change information 901.

The control unit 400 of the server 100i controls start or stop of both a process and the operation for taking over of the process based on the state change information 901 (indicating an update state-transition) obtained from the cluster management unit 110 of the server 100i. The control unit 400 is comprised of a process controller 410 and a taking-over controller 420. The process controller 410 controls start or stop of the process and the taking-over controller 420 controls start or stop of taking-over operation for the process. The process mentioned here means execution of application such as data base management system (DBMS) or the like.

The server priority process unit 700 of the server 100i stores the priority (server priority) 210 of the server 100i in a priority storage area (not shown) secured in the disk drive 200i of the server 100i and compares that priority 210 with the priority 210 memorized in the disk drive 200*j*. This server priority 210 is information for determining a server which carried out the process most recently and is expressed by the states, 1, 2 and 3. The server priority process unit 700 of the server 100*i* is comprised of state writing processor 710 and comparing processor 720. The state writing processor 710 updates the priority 210 of the server 100*i* stored in the disk drive 200*i* of the server 100*i* based on the state change information 901 obtained from the cluster management unit 110 of the server 100*i*. When the state change information 901 indicating a restoration of the server 100*i* from a fault is received from the cluster management unit 110 of the server 100*i*, the comparing processor 720 sends or receives the priority 210 to/from the comparing processor 720 of the server 100*j* through the network 500. Then, the comparing processor 720 determines whether or not the priority of the server 100*i* is higher by comparing the priority 210 of the server 100*i* with the priority 210 of the server 100*j*. A detail of this determination will be described later. A result of priority determination conducted by the comparing processor 720 is used for determination about whether or not the server 100*i* is a server which carried out the process most recently, that is, whether or not the server 100*i* is a master server, carried out in the cluster management unit 110 of the server 100*i*.

The command sending computer 300 sends a forced start instruction based on a request (operation) of user to the cluster management unit 110 of the server 100*i* specified by the instruction, of the servers 100*a* and 100*b* through the network 500. This forced start instruction is an instruction which forces the specified server 100*i* to start the process.

Here, a background of art for introduction of the forced start function for a process using the forced start instruction will be described. If fault occurs in both of the servers 100*a* and 100*b* and after that, one of them is restored from the fault, that is, the aforementioned action (2) is executed, the restored server 100*i* may be sometimes judged to be a server which should not take over the process. As a system operation of this time, it can be considered to wait for restart of the process until the server 100*j* which properly should carry out the process is restored from a fault. However, it may be sometimes better that the server 100*i* restored from the fault first should restart the process rather, than to keep not carrying out the process until the other server 100*j* is restored from the fault. This is because there is no problem even if the process cannot be continued. Therefore, according to this embodiment, there are prepared two kinds of modes, that is, a forced start mode for forcing a server restored from the fault first to start the process and a wait mode for waiting until a server which properly should carry out the process is restored from the fault. Then, these two modes can be selected through the command sending computer 300 by user's operation. Usually, the system shown in FIG. 1 is automatically set to wait mode, so that the system is changed to forced start mode only when the forced start instruction is given from the command sending computer 300.

Next, the operation of the server 100*a* or 100*b* will be described in detail about mainly the operation of the control unit 400 and server priority process unit 700. The control unit 400 of the server 100*i* (i is a or b), when the state change information 901 indicating update state-transition is sent from the cluster management unit 110, receives the state change information 901. Then, the control unit 400 of the server 100*i* starts or stops the process or starts or stops an operation for taking over of the process, which will be described below, in accordance with an update state indicated by the state change information 901.

First, for start or stop of the process, the process controller 410 in the control unit 400 of the server 100*i* is operated as follows. That is, the process controller 410 carries out the process when the server 100*i* operated thereby becomes master (M) state or single master (SM) state. On the contrary, when the server 100*i* becomes slave (SL) state or halted (X), the process controller 410 does not carry out the process.

Next, for start or stop of the operation for taking over the process, the taking-over controller 420 in the control unit 400 of the server 100*i* is actuated as follows. That is, the taking-over controller 420, when one server gets into single master (SM) or master (M) state while the other server gets into slave (SL) state, exchanges information necessary for the taking over of the process through the network 500. Here, the taking-over controller 420 of the single master or master side acts as a sender for information for the taking over of the process and the taking-over controller 420 of the slave side acts as a receiver for the information. With other combination of the states, no information for taking over of the process is exchanged.

Next, about a detailed operation of the server priority process unit 700 of the server 100*i*, operations of the state writing processor 710 and comparing processor 720 which compose the server priority process unit 700, will be described separately in succession.

Figure 3:
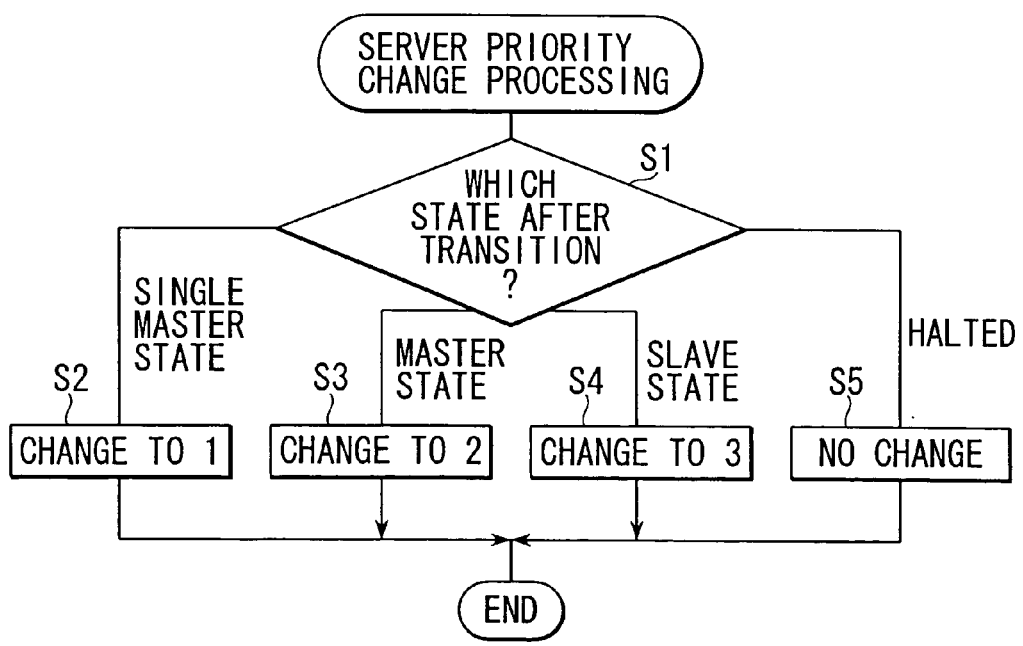
FIG. 3 is a flow chart for explaining server priority change processing by a state writing processor 710 of FIG. 1.

If the state change information 901 indicating an update state-transition is sent from the cluster management unit 110 of the server 100*i*, the state writing processor 710 in the server priority process unit 700 of the server 100*i* carries out a server priority change processing for changing the server priority 210 stored in the disk drive 200*i* of the server 100*i* in accordance with an update state indicated by the state change information 901, following a flow chart shown in FIG. 3. That is, the state writing processor 710, when the state of the server 100*i* operated thereby is changed to single master (SM) state, changes the server priority 210 to 1 (steps S1, S2). Further, the state writing processor 710, when the state of the server 100*i* is changed to master state (M), changes the server priority 210 to 2 (steps S1, S3). Further, when the state of the server 100*i* is changed to slave state (SL), the state writing processor 710 changes the server priority 210 to 3 (steps S1, S4). If it is changed to the halt state (X), the server priority is not changed (steps S1, S5). An initial value of the server priority 210 is different between the servers 100*a* and 100*b*, so that one server is set to 2 while the other server is set to 3. This initial setting for the server priority 210 is carried out by a process before the automatic operation is started.

Next, an operation of the comparing processor 720 in the server priority process unit 700 of the server 10*i*, that is, a priority determining operation of the comparing processor 720 necessary for determining a server which carried out the process most recently by means of the cluster management unit 110 will be described separately about a case where the forced start is executed and a case where the forced start is not executed.

Figure 4:
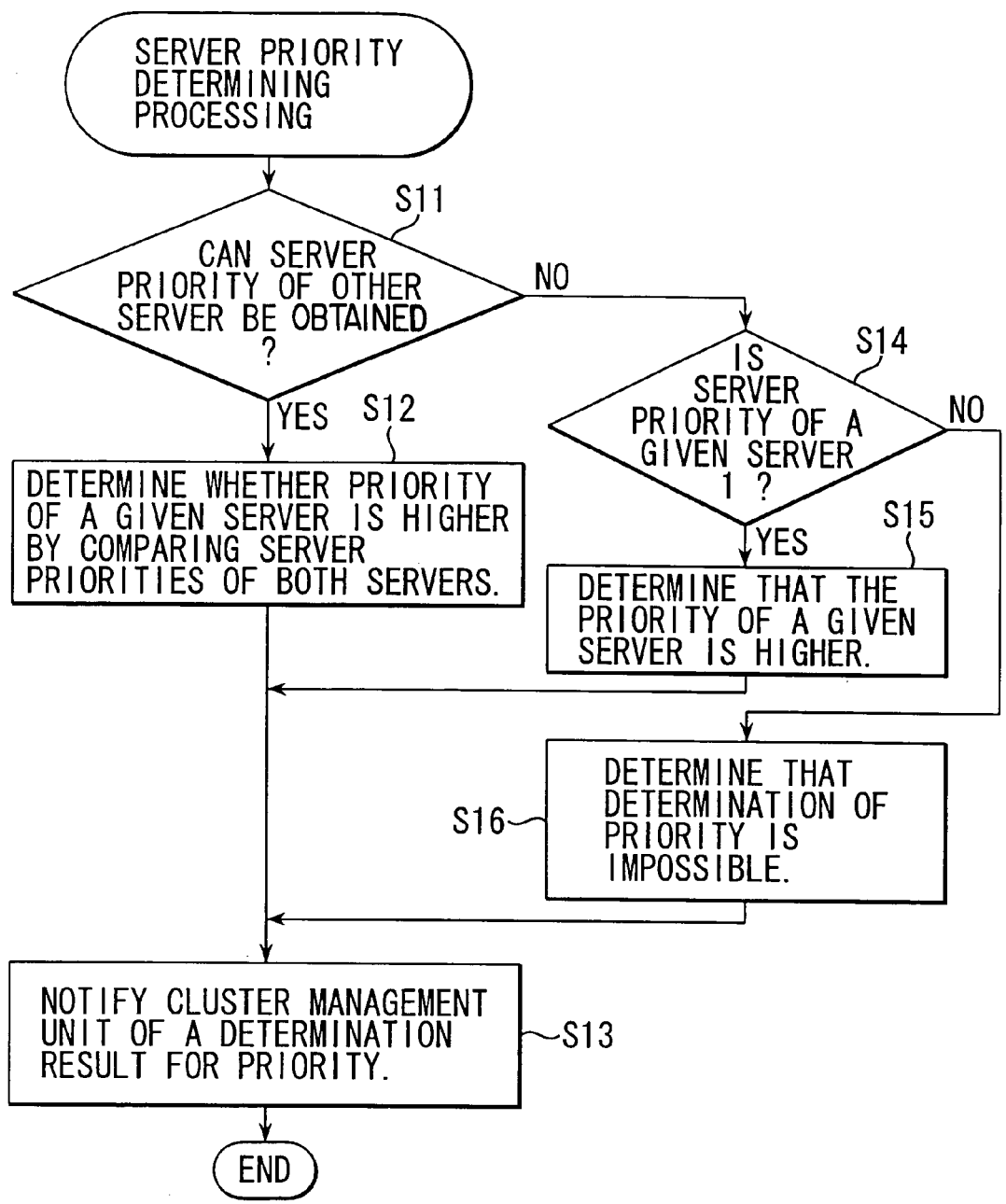
FIG. 4 is a flow chart for explaining server priority determining processing by comparing processor 720 of FIG. 1.

First, an operation of the case where the forced start is not executed will be described with reference to a flow chart of FIG. 4. Cases where the server which carried out the process most recently needs to be determined in accordance with the state transition diagram 800 of FIG. 2 includes two cases, that is, a case where the state-transition is from 1-1-1 to 1-1-2 or from 1-2-1 to 1-2-2 and a case where the state-transition is 2-1 or 2-2. The former is the case where the two servers 100a and 100b get into fault and are halted (X X), and then they are restored from the faults. The latter is the case where any one of the two servers 100a and 100b is restored from the fault. In a following description, 1-1-1 to 1-1-2, 1-2-1 to 1-2-2 are expressed as 1-1, 1-2 by indicating common portions.

The cluster management unit 110 of the server 100i, when the server 100i is restored from a fault with the state (X X), sends the state change information 901 indicating that notice to the server priority process unit 700 of the server 100i. When the state change information 901 indicating that the server 100i is restored from a fault is sent from the cluster management unit 110 of the server 100i, the comparing processor 720 in the server priority process unit 700 of the server 100i determines that the server priority determining operation necessary for determining whether or not the server 100i carried out the process most recently has been requested because the state-transition of 1-1 or 1-2 or the state-transition of 2-1 or 2-2 is carried out. In this case, the comparing processor 720 in the server priority process unit 700 of the server 100i performs the server priority determining operation as follows in accordance with which the state-transition of 1-1 or 1-2 or the state-transition of 2-1 or 2-2 is carried out.

(A) If the state-transition of 1-1 or 1-2 is carried out:

(A1) The comparing processor 720 in the server priority process unit 700 of the server 100i exchanges the server priority 210 with the comparing processor 720 of the other server 100j through communication (step S11). Then, the comparing processor 720 in the server priority process unit 700 of the server 100i compares the server priority 210 of the server (object server) 100i with the server priority 210 of the server (other server) 100j so as to determine which server has a higher server priority 210 (step S12). Here, the server priority 210 is the top priority at 1 and successively lowers in the order of 2, 3. That is, the server priority 210 indicates the top priority at 1, the second priority at 2 and the lowest priority at 3. Meanwhile, when the server priority 210 of the server 100i is 1, it is permissible to determine that the server priority 210 of the server 100i is higher without obtaining the server priority 210 of the other server 100j. This reason will be described later.

(A2) The comparing processor 720 in the server priority process unit 700 of the server 100i notifies the cluster management unit 110 of a determination result for the server priority 210, that is, a result of determination on whether or not the priority of the server (object server) 100i is higher, as a response corresponding to the state change information 901 sent from the cluster management unit 110 of the server 100i under the (X X) state (step S13).

Figure 5:
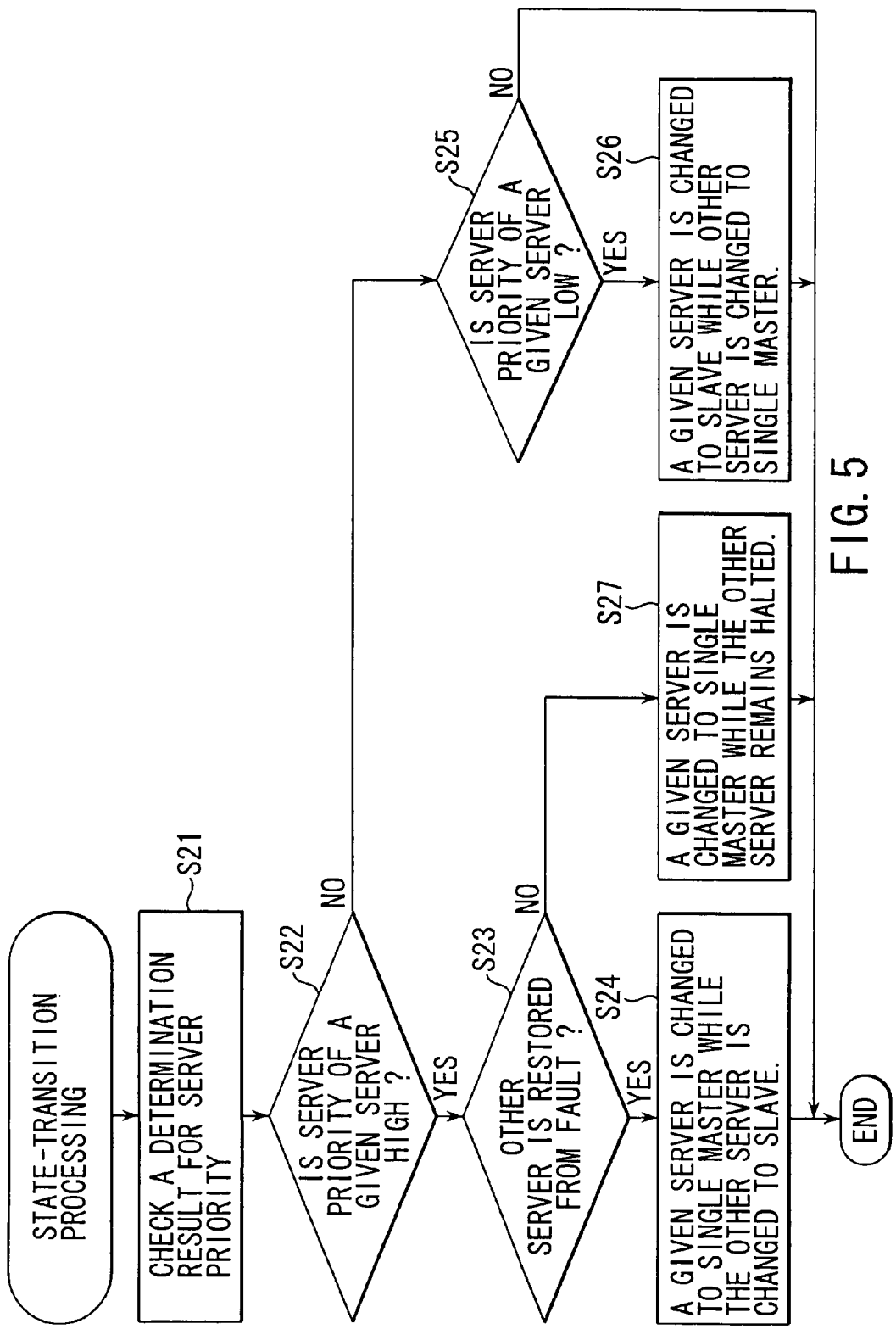
FIG. 5 is a flow chart for explaining state-transition process for recovery from fault by cluster management unit 110 of FIG. 1.

(A3) When the determination result for the server priority is received from the comparing processor 720, the cluster management unit 110 of the server 100i carries out the following state-transition according to a flow chart shown in FIG. 5 based on the determination result, whether or not the server 100j is restored from the fault and the state transition diagram 800. First, if the cluster management unit 110 of the server 100i determines that the server 100i has a higher server priority 210, from the result of server priority from the comparing processor 720 (steps S21, S22), it determines that the server 100i carried out the process most recently. At this time, if the other server 100j is also restored from the fault (step S23), the cluster management unit 110 of the server 100i carries out such a state-transition that the server 100i becomes in single master (SM) state while the server 100j becomes in slave (SL) state, so that finally the server 100i becomes master (step S24). On the contrary, if the server priority 210 of the server 100j is higher (step S25), the cluster management unit 110 of the server 100i determines that the server 100i is not a server which carried out the process most recently and therefore finally the server 100j becomes master. In this case, the cluster management unit 110 of the server 100i carries out such a state-transition that the server 100i becomes in slave (SL) state while the server 100j becomes in single master (SM) state (step S26). That is, the state-transition of 1-1-1 (SL SM) or 1-2-1 (SM SL) of FIG. 2 is carried out. If the server 100j is not restored from a fault (step S23), the state-transition of 2-1 (X SM) or 2-2 (SM X), which will be described later, is carried out (step S27).

(A4) If the state-transition of 1-1-1 (SL SM) or 1-2-1 (SM SL) is carried out, the cluster management unit 110 of the server 100i sends a state change result, that is, the state change information 901 indicating update state-transition (SL SM) or (SM SL) to the control unit 400 and server priority process unit 700 of the same server 100i. An operation content of the control unit 400 and server priority process unit 700 of the server 100i is evident from the above description. Therefore, a server having a higher server priority 210 of the servers 100i and 100j finally becomes master unless the server 100i or 100j gets into fault again. That is, the state-transition of 1-1-2 (SL M) or 1-2-2 (M SL) shown in FIG. 2 is carried out.

(B) If the state-transition of 2-1 or 2-2 is carried out:

(B1) As described above, the comparing processor 720 in the server priority process unit 700 of the server 100i exchanges the server priority 210 with the comparing processor 720 in the server priority process unit 700 of the other server 100j through the network 500 (step S11). Then, the comparing processor 720 in the server priority process unit 700 of the server 100i compares which has a higher server priority 210, the object server 100i or the other server 100j. However, if the state-transition of 2-1 or 2-2 is carried out, the server 100j remains halted (X). In this case, the comparing processor 720 in the server priority process unit 700 of the server 100i cannot obtain the server priority 210 of the server 100j. However, if the server priority 210 of the server 100i is 1, the comparing processor 720 in the server priority process unit 700 of the server 100i can determine that the server priority of the server 100i is higher regardless of the server priority 210 of the server 100j.

(B2) Then, if the server priority 210 of the server 100j cannot be obtained because the server 100j is halted (step S11), the comparing processor 720 in the server priority process unit 700 of the server 100i determines whether or not the server priority 210 of the server 100i is 1 (that is, top priority) (step S14). If the server priority 210 of the server 100i is 1, the comparing processor 720 in the server priority process unit 700 of the server 100i notifies the cluster management unit 110 of the server 100i of a determination result for the server priority indicating that the server 100i has a higher server priority 210 than the server 100j, without comparing with the server priority 210 of the server 100j (steps S15, S13).

If the server priority 210 of the server 100j is not 1 (step S14), the comparing processor 720 in the server priority process unit 700 of the server 100i judges that whether or not the priority of the server 100i is higher cannot be determined with only the server priority 210 of the server 100i (step S16). In this case, the server priority process unit 700 of the server 100i notifies the cluster management unit 110 of the server 100i of the determination result indicating that determination of the priority is impossible (step S13). Meanwhile if the server priority 210 of the server 100i is 3, it can be determined that the priority of the server 100*i* is lower than the server 1000*j*, that is, the priority of the server 100*j* is higher. However, if the server 100*j* is halted like in this example, the state-transition cannot be carried out. Thus, according to this embodiment, if the server 100*j* is not restored from the fault, the comparing processor 720 in the server priority process unit 700 of the server 100*i* treats everything as priority determination impossible except that the server priority 210 of the server 100*i* is 1.

(B3) If the cluster management unit 110 of the server 100*i* receives the server priority determination result from the comparing processor 720, it executes the following state-transition according to the flow chart of FIG. 5 based on the determination result, whether or not the server 100*j* is restored from the fault and state transition diagram 800. If the server 100*j* is not restored from a fault and it can be determined that the server priority 210 of the server 100*i* is higher (step S21 to S23), the cluster management unit 110 of the server 100*i* judges that the server 100*i* is a server which carried out the process most recently. In this case, the cluster management unit 110 of the server 100*i* carries out such a state-transition that the server 100*i* becomes single master, in accordance with the state transition diagram 800 (step S27). On the contrary, if the determination result indicates determination impossible, that is, the server 100*j* is not restored from a fault while the server priority 210 of the server 100*i* is not 1 (step S25), the cluster management unit 110 of the server 100*i* does not carry out the state-transition until the server 100*j* is restored from a fault.

Figure 6:
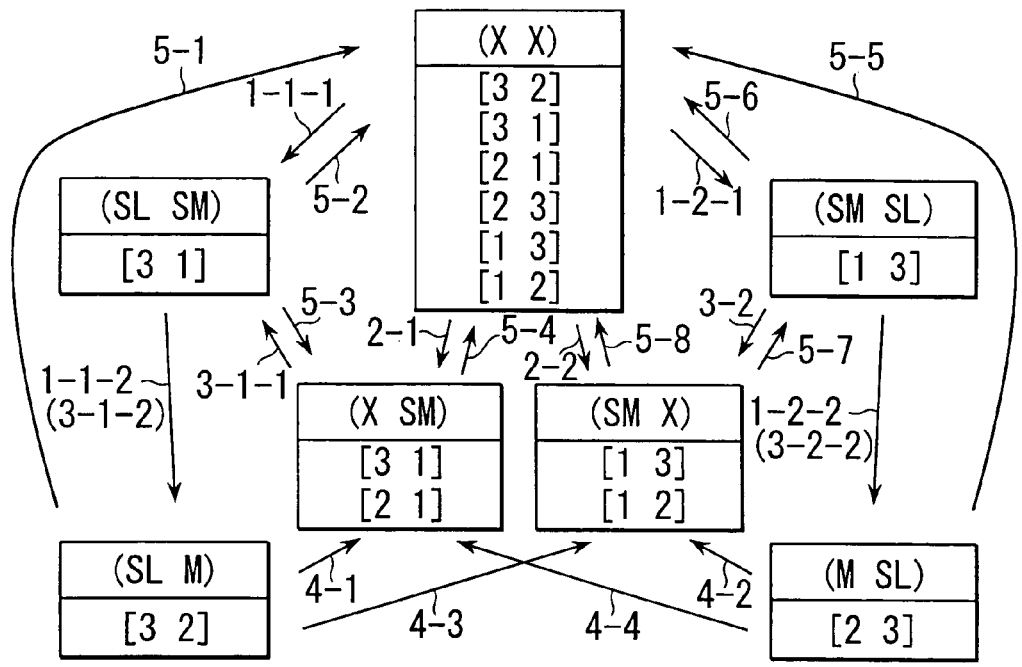
FIG. 6 is a diagram showing local server priority order of each server in correspondence with the state transition diagram 800 of FIG. 2 when a forced startup is not available.

If the server state changes according to the aforementioned determination following the state transition diagram 800 shown in FIG. 2, the server priority 210 changes as shown in FIG. 6. In this diagram, assume that the server state of one server is A and the server priority is Ap and the server state of the other server is B while the server priority is Bp. At this time, the server state is expressed as (A B) and the server priority is expressed as [Ap Bp]. (A B) is different from (B A) and [Ap Bp] is also different from [Bp Ap].

The reason why a server which carried out the process most recently can be determined according to the above described determination method will be described.

Proposition 1: A server having a high server priority 210 is a server which carried out the process most recently.

Proposition 2: If the server priority 210 of a server is 1, that server is a server which carried out the process most recently.

These two propositions are testified. For this purpose, the following three lemmas only have to be established.

Lemma 1:
Assumption:
At a certain time, the server priority of the server 100*i* is set to 1. After that, the server priority of the server 100*i* is not changed and the other server 100*j* is not set to master state or single master state.
The server priority 210 of the server 100*j* is not 1.
Conclusion:
When the server priority of the server 100*i* is 1, the server 100*i* carried out the process most recently.
Lemma 2:
Assumption:
At a certain time, the server priority 210 of the server 100*i* is set to 2. After that, the server priority 210 of the server 100*i* is not changed and the other server 100*j* is not set to master state or single master state.
The server priority 210 of the server 100 is 3.
Conclusion:

When the server priority of the server 100*i* is 2 and the server priority 210 of the other server 100*j* is 3, the server 100*i* carried out the process most recently.
Lemma 3
Assumption:
Both the servers 100*i* and 100*j* are halted.
Conclusion:
The server priorities of both of the servers 100*i* and 100*j* are different.
Proof of proposition 1
First, the proposition 1 is proved by conclusions of the lemmas 1, 2 and 3. To prove the proposition 1, it only needs to prove that one of the two servers which has a priority higher than that of the other server, carried out the process most recently. Because the server priorities of the servers 100*i* and 100*j* are different when both of the servers 100*i* and 100*j* are halted, because of the lemma 3, combinations of the server priorities which may be 1, 2 or 3 are three types including [1 2], [1 3], and [2 3]. Because of the lemma 1, in case of combination of [1 2] or [1 3], a server whose server priority 210 is 1 carries out the process most recently. Next, because of the lemma 2, in case of combination of [2 3], a server whose server priority is 2 carries out the process most recently. Therefore, in all cases, it can be said that a server having a higher server priority 210 carries out the process most recently.

Proof of proposition 2:
Next, the proposition 2 will be proved using conclusions of the lemma 1 and 3. Because of an assumption of the proposition 2, the server priority 210 of the server 100*i* is 1. At this time, because of the lemma 3, the server priority 1 of the other server 100*j* is not 1. Because of the lemma 1, at this time, the server 100*i* is a server which carried out the process most recently. As described here, if the lemmas 1, 2 and 3 are established, the propositions 1 and 2 are established.

Next, about the lemmas 1, 2 and 3, it is proved that if their assumptions are established, the conclusions are also established and finally it is proved that the assumption of each lemma is also established.

Proving that a conclusion is established from an assumption of the lemma 1:

That the server priority 210 of the server 100*i* is set to 1 means that the server 100*i* is in single master state at that time. Then, that the other server 100*j* did not become master or single master only once means that the server 100*j* did not carry out the process only once since then. Thus, the server which carried out the process most recently is the server 100*i*. That after the server priority 210 of the server 100 was set to 1, the server priority was not changed means that the current priority of the server 100*i* is 1. Because of the assumption, the current server priority 210 of the other server 100*j* is not 1. Thus, when the server priority 210 of the server 100*i* is 1 while the server priority 210 of the server 100*j* is not 1, a server which carried out the process most recently is the server 100*i*.

Proving that the conclusion is established from an assumption of the lemma 2:

That the server priority 210 of the server 100*i* is set to 2 means that the server 100*i* was in master state at that time. For the server 100*i* to get into master state, the other server 100*j* always has to be in slave state. Therefore, the server priority 210 of the server 100*j* at that time is 3. That the server did not become master or single master only once means that that server 100*j* did not carry out the process only once since then. Thus, the server which carried out the process most recently is the server 100*i*. Further, because the server priority 210 of the server 100*j* is not changed until the server 100*j* becomes master or single master, the server priority 210 of the server 100*j* remains 3. Further, that after the server priority 210 of the server 100*i* was set to 2, the priority 210 was not changed means that the current priority of the server 100*i* is 2. Thus, when the server priority 210 of the server 100*i* is 2 while the server priority 210 of the server 100*j* is 3, the server which carried out the process most recently is the server 100*i*.

Proving that the conclusion can be established from an assumption of the lemma 3:

To prove that the server priorities 210 of the servers 100*i* and 100*j* are of different values (states) when both of the servers 100*i* and 100*j* are halted, it only should be proved that the server priorities 210 are always of different values. Thus, the following four assumptions 3-1 to 3-4 only should be proved.

Assumption 3-1:

The initial values of the server priorities 210 are different from each other.

Assumption 3-2:

When the server priority 210 of a server is 1, the server priority of the other server is not 1.

Assumption 3-3:

When the server priority 210 of one server is 2, the server priority of the other server is not 2.

Assumption 3-4:

When the server priority of one server is 3, the server priority 210 of the other server is not 3.

If these can be proved, it can be said that even if the server priority of one server is 1, 2 or 3, the server priority 210 of the other server is not the same.

The assumption 3-1 is evident from the initial operation of the server priority 210 of the servers 100*a* and 100*b*. The assumption 3-2 to 3-4 will be proven as follows.

Proof of the assumption 3-2:

When the server priority 210 of a server becomes 1, the other server 100*j* remains halted. To make the server priority 210 of the server 100*j* to be 1 without changing the server priority 210 of the server 100*i*, the server 100*j* must be made in single master state. For that purpose, both of the servers 100*i* and 100*j* must be halted temporarily and then the server 100*i* must become slave and the server 100*j* must remain halted. However, at this point, the server priority 210 of the server 100*i* is 1. However, this is inconsistent to a method for determining state-transition to the master/slave after both of the servers 100*i* and 100*j* are halted. Thus, it is impossible that the server priority 210 of one server 100*i* is kept unchanged and the other server 100*j* becomes single master. That is, when the server priority 210 of one server 100*i* is 1, the server priority of the other server 100*j* is not 1.

Proof of the assumption 3-3

When the server priority 210 of one server 100*i* is 2, the server priority of the other server always becomes 3. Therefore, when the server priority of one server 100*i* is 2, the server priority of the other server 100*j* does not become 2.

Proof of the assumption 3-4:

When the server priority 210 of one server 100*i* becomes 3, the other server 100*j* remains in master state. To make the server priority 210 of the server 100*j* to be 3 without changing the server priority 210 of the server 100*i*, the server 100*i* must be made into slave state. For that purpose, both of the servers 100*i* and 100*j* must be changed to the halted state temporarily and then the server 100*i* must remains halted while the server 100*j* must be changed to the slave state. However, the server priorities 210 of the servers 100*i* and 100*j* are 3 and 2, respectively, so that the server priority of the server 100*j* is higher. This is inconsistent to the method for determining state-transition to master/slave state after both of the servers 100*i* and 100*j* are halted. Thus, it is impossible that without changing the server priority 210 of one server 100*i*, the other server 100*j* becomes slave. That is, when the server priority of one server 100*i* is 3, the server priority 210 of the other server 100*j* does not become 3.

As described above, about the lemmas 1, 2 and 3, it can be proved that the conclusion can be established from the assumption. Next, it will be proved that the lemmas 1 and 2 can be established.

Proving that the assumption of the lemma 1 can be established:

When the server priority 210 of the server 100*i* is set to 1, the server priority 210 of the other server 100*j* may not be 1 if so, the server 100*j* cannot become master or single master without changing the server priority 210 of the server 100*i*. Why so will be described with reference to the state transition diagram 800 of FIG. 6. FIG. 6 shows the priorities 210 assigned to the servers 100*i* and 100*j* in accordance with the state-transitions of the servers 100*i* and 100*j*.

After the server priority 210 of the server 100*i* is set to 1, for the other server 100*j* to get into master state, the server 100*i* needs to be in slave state. However, the server priority 210 of the server 100*i* is changed to 3. Therefore, the server 100*j* cannot become master without changing the server priority 210 of the server 100*i*. Thus, after the server priority of the server 100*i* is set to 1, the server 100*j* has not become master.

After the server priority 210 of the server 100*i* is set to 1, for the other server 100*j* to become single master, any one of the state-transitions 1 to 3 need occur according to the state transition diagram 800. The first state-transition means that after the server 100*j* becomes master and the server 100*i* becomes slave, the server 100*j* becomes single master. The second state-transition means a state in which the server 100*j* becomes slave while the server 100*i* becomes master and after that, the server 100*j* becomes single master. The third state-transition means a state in which both of the servers 100*i* and 100*j* become halted and after that, the server 100*j* becomes single master.

However, if one server is in master state while the other server is in slave state, the server priority 210 of the server 100*i* is changed. Therefore, it is impossible that without changing the server priority 210 of the server 100*i*, the server 100*j* becomes single master. After both of the servers 100*i* and 100*j* to be halted, for the server 100*j* to become single master, the server priority 210 of the server 100*j* must be 1 because of definition on the aforementioned determination method. This is contrary to the assumption. Thus, it can be said that after the server priority 210 of the server 100*i* is set to 1, the server 100*j* is not in single master state. For the reason, it is impossible that without changing the server priority 210 of the server 100*i*, the other server 100*j* cannot become master or single master.

Proving that the assumption of the lemma 2 can be established:

That when the server priority 210 of the server 100*i* is set to 2, the other server 100*j* cannot be in master state or single master state without changing the server priority 210 of the server 100*i* will be described with reference to the state transition diagram 800 shown in FIG. 6.

When the server priority 210 of the server 100*i* is set to 2, the server 100*i* is always in master state, while the other server 100*j* is always in slave state. After the server priority 210 of the server 100*i* is set to 2, for the other server 100*j* to become master, the server 100*i* needs to be in slave state. However, the server priority 210 of the server 100*i* is changed to 3. Therefore, it is impossible that without changing the server priority 210 of the server 100*i*, the server 100*j* becomes master. Therefore, after the server priority 210 of the server 100*i* is set to 2, the server 100*j* is not in master state.

After the server priority 210 of the server 100*i* is set to 2, the other server 100*j* can become single master without changing the server priority 210 of the server 100*i*. However, to make the server priority 210 of the server 100*j* to be 3 without changing the server priority 210 of the server 100*i*, according to the state transition diagram 800 of FIG. 6, both of the servers 100*i* and 100*j* must be halted temporarily and then, the server 100*i* must remain halted while the server 100*j* must be in slave state. However, the server priority of the server 100*i* is 2 and that of the server 100*j* is 1 at this time. This is inconsistent to the method for determining a state-transition to master/slave after both of the servers 100*i* and 100*j* are halted. Therefore, it is impossible that without changing the server priority 210 of the server 100*i*, the server 100*j* becomes single master. That is, after the server priority 210 of the server 100*i* is set to 1, the server 100*j* is not in single master state. Thus, after the server priority 210 of the server 100*i* is set to 2, the other server 100*j* cannot become master or single master.

Thus, if the server priority 210 of any server is 2 while the server priority 210 of the other server is 3 when both of the servers 100*i* and 100*j* are halted, a server whose server priority 210 is 2, that is, a server having a higher priority can be said to be a server which carried out the process most recently.

Figure 7:
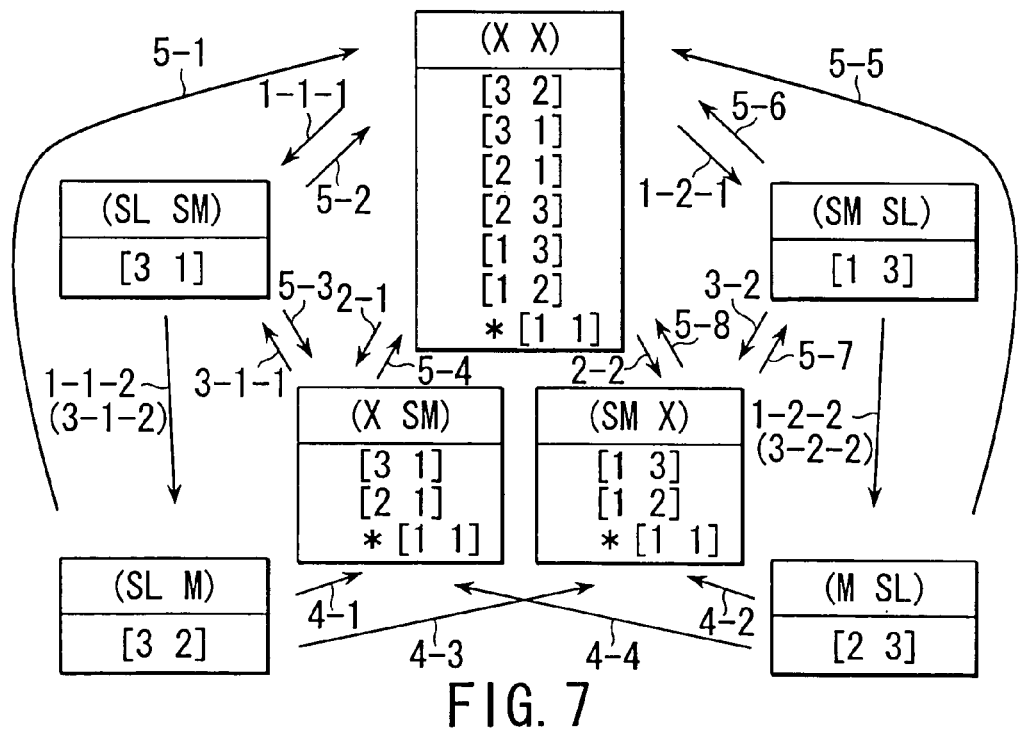
FIG. 7 is a diagram showing local server priority order of each server in correspondence with the state transition diagram of FIG. 2 when the forced startup is available.

Next, an operation for the forced start will be described. FIG. 7 shows a state-transition of a case where the forced start is applied and a transition of the server priority 210. What is different between the state-transition of the case where the forced start is applied shown in FIG. 7 and a case where the forced start is not applied as shown in FIG. 6 is state-transition 2-1 or 2-2 from the state (X X), namely, state-transition 2-1 or 2-2 indicated by a bold arrow, which means that there is a state-transition which forces a server having a lower server priority 210 into single master.

Thus, the servers 100*i* and 100*j* may have a server priority provided with * in FIG. 7, namely, a server priority 210 indicated by [1 1] when they are in any state of (X X), (X SM) and (SM X). For example, when the server priority is [1 3] or [1 2] under a state of (X X), a state-transition to (X SM) can be carried out by the forced start. At that time, the server priorities of the servers 100*i* and 100*j* are [1 1]. If a fault occurs in any server in single master state of the servers 100*i* and 100*j*, the server priority of the servers 100*i* and 100*j* is [1 1] with (X X).

If as a result of the forced start, the server priorities 210 of both of the servers 100*i* and 100*j* happen to be the same, a server having a higher server priority cannot be judged. Thus, if the servers 100*i* and 100*j* are restored from the fault, a server which carried out the process most recently cannot be determined. In this case, it is necessary to execute the forced start again.

Because as a result of the forced startup, there is a possibility that the state [1 1] may occur under (X X) as described above, even if one server is restored from a fault, the state-transition of 2-1 or 2-2 cannot be automatically carried out. To execute the state-transition of 2-1 or 2-2, always the forced start must be carried out.

As described above, according to this embodiment, the state of the server is classified to four types, namely, master state in which the server carries out the process and has a mate which can take over the process, single master state in which the server carries out the process and has no mate which can take over the process, slave state which does not carry out the process but has information necessary for taking over of the process, and halt state in which the server does not carry out the process and holds no further information necessary for taking over of the process. According to this embodiment, according to the state transition diagram 800 prepared based on the above four states, the state-transitions of the servers 100*a* and 100*b* are carried out and state variables which are the server priorities 210 of the servers 100*a* and 100*b* determined by this state-transition are stored in the local disk drives 200*a* and 200*b*, so that a server which carried out the process most recently is determined using the state-transition and state variable (server priority 210). As a result, according to this embodiment, the following effect can be obtained.

In case where the forced start is not applied, even if a fault or a restoration from the fault occurs in one or both of the servers 100*a* and 100*b*, that is, at least one of the servers 100*a* and 100*b* at any timing, when a troubled server is restored from it, it is possible to determine whether or not that server is a server which should carry out the process.

According to this embodiment, the actions (1) to (5) for achieving the automatic operation described above are realized by the cluster management unit 110 capable of carrying out the state-transition in the servers 100*a* and 100*b*. Each time when the state-transition is carried out, the server priorities 210 of the servers 100*a* and 100*b* corresponding to the state-transition are stored in the disk drives 200*a* and 200*b* by the state writing processor 710 in the server priority process unit 700 of the servers 100*a* and 100*b*. Then, by comparing the server priorities 210 of the servers 100*a* and 100*b* by means of the comparing processor 720 in the server priority process unit 700 of the respective servers 100*a* and 100*b*, determinations of the servers necessary for the actions (1), (2) are achieved. Therefore, according to this embodiment, the automatic operation can be achieved without using the shared disk drive or time information.

In case where the forced start is applied, even if a restored server cannot be determined to be a server which should take over the process in the action (2), the process can be taken over forcibly as required. In this case also, except when the servers 100*a* and 100*b* are changed to special state of [1 1] under (X X), the process can be automatically taken over. Further, in the aforementioned special case also, the process can be continued by the forced start.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for use in each of two server computers to determine, when one of the server computers is restored from a fault, whether the server computer carried out a process most recently, applicable to a high availability computer system in which when one of the server computers executes the process and a fault occurs in the server computer, the other server computer takes over the process, each of the server computers having a storage unit, the method comprising the steps of:

executing state-transition of the server computers when a fault occurs in one of the server computers or one of the server computers is restored from the fault, each of the server computers being constructed to assume four states, which are master state in which the server computer carries out the process and has a mate which takes over the process, single master state in which the server computer carries out the process and has no mate which takes over the process, slave state in which the server computer does not carry out the process but has information necessary for taking over of the process, and halt state in which the server computer does not carry out the process and holds no further information necessary for taking over of the process;

storing a priority determined by the state-transition into the storage unit, the step of storing including the steps of:

changing the priority of the server computer so as to indicate the highest priority when the state of the server computer is changed to the single master state;

changing the priority of the server computer so as to indicate the second highest priority when the state of the server computer is changed to the master state;

changing the priority of the server computer so as to indicate the lowest priority when the state of the server computer is changed to the slave state; and prohibiting a change of the priority of the server computer when the state of the server computer is changed to the halt state, determining, when the server computer is restored from the fault, whether the priority of the server computer is higher;

determining whether the server computer carried out the process most recently, based on the result of determining whether the priority of the server computer is higher; and determining that the server computer becomes a server computer to take over the process, when it is determined that the server computer carried out the process most recently.

2. The method according to claim 1, wherein the step of determining the priority further includes the step of:

comparing the priorities of the server computers when faults occur in the server computers and after that, the server computers are restored from the faults so as to determine which priority is higher.

3. The method according to claim 2, wherein the step of determining the priority further includes the steps of:

determining, when faults occur in the server computers and after that, only one of the server computers is restored from the fault, whether the priority of the restored server computer is the highest priority; and determining that the priority of the server computer is higher only when the priority is determined to be the highest priority.

4. The method according to claim 3, wherein the step of executing the state-transition further includes the steps of:

executing, when faults occur in the server computers and after that, the server computers are restored from the faults, a first state-transition such that one of the server computers is changed from the halt state to the single master state while the other server computer is changed from the halt state to the slave state, based on at least the result of determining whether the server computer carried out the process most recently; and executing, after the first state-transition is completed, a second state-transition such that one server computer is changed to the master state while the other server computer remains in the slave state.

5. The method according to claim 4, wherein the step of executing the state-transition further includes the steps of:

executing a third state-transition such that one of the server computers is changed from the halt state to the single master state or keeping the current state, based on at least the result of determining whether the server computer carried out the process most recently, when faults occur in the server computers and after that, only one of the server computers is restored from the fault; and executing, when after the step of executing the third state-transition or keeping the current state is completed, the other server computer of the server computers is also restored from the fault, either a fourth state-transition such that the other server computer is changed from the halt state to the slave state or a fifth state-transition in which any one of the server computers is changed to the single master state while the other server computer is changed to the slave state.

6. The method according to claim 3, wherein the step of executing the state-transition further includes the step of:

executing, after faults occur in the server computers and then, only one of the server computers is restored from the fault, the state-transition of the server computer such that the server computer is a server computer which continues the process, when the server computer is not capable of being determined to have a priority higher than the other server computer, because the priority stored in the storage unit of the server computer restored from the fault is not the highest priority and then, a forced start instruction for forcing the server computer to continue the process is given from outside.

7. A high availability computer system comprising two server computers each having a storage unit, each of the server computers comprising:

state-transition means for executing a state-transition of the server computers when a fault occurs in one of the server computers or one of the server computers is restored from the fault, each of the server computers being constructed to assume four states, which are master state in which the server computer carries out a process and has a mate which takes over the process, single master state in which the server computer carries out the process and has no mate which takes over the process, slave state in which the server computer does not carry out the process but has information necessary for taking over of the process, and halt state in which the server computer does not carry out the process and holds no further information necessary for taking over of the process;

state writing means for storing a priority determined by the state-transition into the storage unit, storing a priority comprising: changing the priority of the server computer so as to indicate the highest priority when the state of the server computer is changed to the single master state; changing the priority of the server computer so as to indicate the second highest when the state of the server computer is changed to the master state; changing the priority of the server computer so as to indicate the lowest priority when state of the server computer is changed to the slave state; and prohibiting a change of the priority of the server computer when the state of the server computer is changed to the halt state;

first determining means for determining, when the server computer is restored from the fault, whether the priority of the server computer is higher;

second determining means for determining whether the server computer carried out the process most recently, based on the determination result of the first determining means; and third determining means for determining that the server computer restored from the fault becomes a server computer to take over the process, when it is determined that the server computer carried out the process most recently.

8. A high availability computer system according to claim 7, wherein the first determining means compares the priorities of the server computers, when faults occur in the server computers and then the server computers are restored from the faults, so as to determine which priority is higher.

9. A high availability computer system according to claim 8, wherein the first determining means, when faults occur in the server computers and then only one of the server computers is restored from the fault, determines whether the priority of the server computer is the highest priority and only when the priority is the highest priority, determines that the priority of the server computer is higher.

10. A high availability computer system according to claim 9, wherein the state-transition means, when faults occur in the server computers and then the server computers are restored from the faults, executes such state-transition that one of the server computers is changed from the halt state to the single master state while the other server computer is changed from the halt state to the slave state, based on at least the determination result of the third determining means, and then executes such state-transition that the server computer is changed to the master state while the other server computer remains in the slave state.

11. A high availability computer system according to claim 9, wherein the state-transition means, when faults occur in the server computers and then only one of the server computers is restored from the fault, either executes such state-transition that the server computer is changed from the halt state to the single master state or keeps the current state, based on at least the determination result of the third determining means, and then when the other server computer of the server computers is also restored from the fault, executes either state-transition that the other server computer is changed from the halt state to the slave state or state-transition in which any one of the server computers is changed to the single master state while the other server computer is changed to the slave state.

12. A computer readable recording medium storing a program, executed by each of two server computers, for determining, when one of the server computers is restored from a fault, whether the server computer carried out a process most recently, applicable to high availability computer system in which when one of the server computers executes the process and a fault occurs in the server computer, the other server computer takes over the process, each server computer having a storage unit, the program comprising:

code means for when a fault occurs in one of the server computers or one of the server computers is restored from the fault, causing the server computer to execute state-transition of the server computers, each of the server computers being constructed to assume four states, which are master state in which the server computer carries out the process and has a mate which takes over the process, single master state in which the server computer carries out the process and has no mate which takes over the process, slave state in which the server computer does not carry out the process but has information necessary for taking over of the process, and halt state in which the server computer does not carry out the process and holds no further information necessary for taking over of the process;

code means for causing the server computer to store a priority determined by the state-transition into the storage unit, the code means for causing the server computer to store a priority including:

code means for causing the server computer to change the priority of the server computer so as to indicate the highest priority when the state of the server computer is changed to the single master state;

code means for causing the server computer to change the priority of the server computer so as to indicate the second highest priority when the state of the server computer is changed to the master state;

code means for causing the server computer to chance the priority of the server computer so as to indicate the lowest priority when the state of the server computer is changed to the slave state; and code means for causing the server computer to prohibit a change of the priority of the server computer when the state of the server computer is changed to the halt state, code means for when the server computer is restored from the fault, causing the server computer to determine whether the priority of the server computer is higher;

code means for causing the server computer to determine whether the server computer carried out the process most recently, based on the result of determining whether the priority of the server computer is higher; and code means for causing the server computer to determine that the server computer restored from the fault becomes a server computer to take over the process, when it is determined that the server computer carried out the process most recently.

* * * * *

UNITED STATES PATENT AND TRADEMARK OFFICE
CERTIFICATE OF CORRECTION

| | | |
|---|---|---|
| PATENT NO. | : 7,171,465 B1 | Page 1 of 1 |
| APPLICATION NO. | : 09/667769 | |
| DATED | : January 30, 2007 | |
| INVENTOR(S) | : Endo et al. | |

It is certified that error appears in the above-identified patent and that said Letters Patent is hereby corrected as shown below:

Claim 12, column 24, line 31, change "chance" to --change--.

Signed and Sealed this

Tenth Day of April, 2007

JON W. DUDAS
*Director of the United States Patent and Trademark Office*